(12) United States Patent
Trionfetti

(10) Patent No.: US 12,716,800 B2
(45) Date of Patent: Aug. 25, 2026

(54) SYSTEM FOR MEASURING ROTATIONAL IMBALANCES FOR A BALANCING MACHINE OF A ROTATING WORKPIECE

(71) Applicant: BALANCE SYSTEMS S.R.L., Milan (IT)

(72) Inventor: Gianni Trionfetti, Agrate Brianza (IT)

(73) Assignee: BALANCE SYSTEMS S.R.L., Milan (IT)

( * ) Notice: Subject to any disclaimer, the term of this patent is extended or adjusted under 35 U.S.C. 154(b) by 245 days.

(21) Appl. No.: 18/511,552

(22) Filed: Nov. 16, 2023

(65) Prior Publication Data

US 2024/0167904 A1 May 23, 2024

(30) Foreign Application Priority Data

Nov. 17, 2022 (IT) ........................ 102022000023730

(51) Int. Cl.
*G01M 1/22* (2006.01)

(52) U.S. Cl.
CPC .................................... *G01M 1/22* (2013.01)

(58) Field of Classification Search
CPC ............ G01M 1/02; G01M 1/08; G01M 1/22; G01M 1/16
See application file for complete search history.

(56) References Cited

U.S. PATENT DOCUMENTS 4,406,164 A 9/1983 Hines et al.
4,981,043 A 1/1991 Okumura
9,494,479 B2 * 11/2016 Rogalla .................. G01M 1/24
10,837,856 B2 * 11/2020 Ishitoya .................. G01M 1/24
2021/0396621 A1 * 12/2021 Guo ........................ G01M 1/32

FOREIGN PATENT DOCUMENTS

CN 114127528 A * 3/2022 .......... G01M 13/025
DE 407266 C * 1/1924
EP 4184139 A1 * 5/2023 ............. G01M 1/22
FR 735974 A 11/1932
FR 879239 A 2/1943

OTHER PUBLICATIONS

Italy Search Report for IT202200023730 completed Jun. 2, 2023, 7 pages.

* cited by examiner

*Primary Examiner* — Octavia Hollington
(74) *Attorney, Agent, or Firm* — NIXON & VANDERHYE

(57) ABSTRACT

A system for measuring rotational imbalances for a rotating workpiece balancing machine, the workpiece defining a rotation and a force determined by imbalances in at least one plane during rotation, includes a fixed support, a movable support connected to the fixed support, configured to allow at least part of the workpiece to be accommodated, and configured to allow micro-movements relative to the fixed support along the plane proportional to the force, a sensor operatively connected to the fixed support and to the movable support and suitable for sensing forces, and a clamp loosely constraining to the movable support and the fixed support in order to permit the relative micro-movements between the movable support and the fixed support exclusively along a predetermined trajectory lying in the plane, and including an opposing system realizing a moment opposite to the moment generated by the workpiece when placed on the movable support.

9 Claims, 2 Drawing Sheets

SYSTEM FOR MEASURING ROTATIONAL IMBALANCES FOR A BALANCING MACHINE OF A ROTATING WORKPIECE

This application claims priority to IT 102022000023730 filed Nov. 17, 2022, the entire contents of which are hereby incorporated by reference.

BACKGROUND OF THE INVENTION

Field of the Invention

The present invention relates to a system for measuring rotational imbalances for a balancing machine of a rotating workpiece of the type specified in the preamble of the first claim.

In particular, the present invention has as its object a measuring system capable of making different types of measurements related to the rotation of a workpiece without having to modify or replace the system, that is, by realizing a plurality of different modes of operation.

Description of the Related Art

As is well known, rotating workpieces are often subject to balancing in order to prevent oscillations induced by unwanted imbalances from causing the workpiece itself to make eccentric rotations relative to the main axis of rotation.

Common rotating parts may, for example, be rotary motors possibly fitted with a shaft or may also simply consist of a wheel.

In general, measuring systems for conventional balancing machines are configured to detect vibrations induced on the rotating shaft resulting from imbalances.

Currently, basically three different types of systems are known.

Oscillating-supported systems include at least one slip support on which a rotating shaft can rest, a fixed support on which the slip support is laboriously constrained, and at least one electrodynamic detector. The latter is, therefore, operationally connected to the slip support by a connecting rod connected to a moving coil in such a way that it can detect signals proportional to the speed of vibration of the rotating shaft.

Rigidly supported systems include caster wheels on which the rotating shaft rests, at least one support frame for the caster wheels, at least one fixed support, and a piezoelectric transducer arranged between the fixed support and the support frame. The caster wheels are generally convex or lapped and must not have a diameter equal to or similar to the diameter of the shaft resting on them.

The piezoelectric transducer is configured to detect a signal proportional to the force impressed by the support frame on the transducer that is known to be determined by the deformation of the piezoelectric transducer.

Semi-rigidly supported systems are very similar to rigidly supported systems and, in fact, like rigidly supported systems, are also known by the term force-measured systems.

The main difference between the two systems is that, in the latter case, the support frame includes two or more elastic bending zones due to which micro-deformations of the support frame can be picked up. The transducer, moreover, is electrodynamic, is operationally connected to the support frame, and includes a voice coil configured to detect a signal proportional to the frame deformation and strain rate.

The known technique described includes some important drawbacks.

In particular, oscillating support systems require specific calibration for each type of rotating device resting on the oscillating support. In addition, the construction of the supports is quite complex, and the sensitivity of the system is greatly affected by some external parameters such as, for example, the weight of the rotating device and/or the type of measuring equipment.

Rigid or semi-rigid support systems, on the other hand, have the important drawbacks of not allowing high accuracies, having longer measurement times than oscillating support systems, requiring heavier structures, and needing specific accommodations; in fact, as mentioned above, rigid support systems cannot allow measurements at high revolutions since the rotating frequency must be far from, and below, the resonance frequency of the support frame.

To overcome these drawbacks, a system described in patent application IT102020000021628 was developed.

Such a system essentially comprises particular clamping means configured to bind the movable support and the fixed support jointly, on command, in such a way as to define at least a first sensing mode in which the supports are not bound by the clamping means and the sensing means detect a displacement of said movable support determined by a vibration of the rotating workpiece, and a second sensing mode in which the supports are bound jointly by the clamping means and the sensing means detect a deformation of the movable support or a strain on the movable support determined by the imbalance. Thus, in other words, the clamping means enable the system to make detections in both the oscillating mode and the rigid or semi-rigid mode.

However, even the system just described includes some important drawbacks.

In particular, the overall structure of the system is complex, comprising a plurality of different devices interacting with each other, and is therefore uneconomical.

Moreover, in any case, the system just described is not universal and, in order to work with workpieces of widely varying weights, it must be preconfigured, slowing down measurement operations in any case.

BRIEF SUMMARY OF THE INVENTION

In this situation, the technical task underlying the present invention is to devise a system for measuring rotational imbalances for a balancing machine of a rotating workpiece capable of substantially obviating at least part of the aforementioned drawbacks.

Within the scope of said technical task, it is an important purpose of the invention to obtain a system for measuring rotational imbalances for a balancing machine of a rotating workpiece capable of effectively detecting vibrations on rotating devices of any weight and size.

Another important purpose of the invention is to realize a system for measuring rotational imbalances for a balancing machine of a rotating workpiece that, in the face of high efficiency, defines a simple and economical structure.

Specifically, a further task of the invention is to realize a system for measuring rotational imbalances for a balancing machine of a rotating workpiece that enables accurate readings to be taken in a universal way, without having to change its behavior or structural configuration.

The specified technical task and purposes are achieved by a system for measuring rotational imbalances for a balancing machine of a rotating workpiece as claimed in the attached claim 1.

Preferred technical solutions are highlighted in the dependent claims.

BRIEF DESCRIPTION OF THE DRAWINGS

The features and advantages of the invention are clarified below by the detailed description of preferred embodiments of the invention, with reference to the attached drawings, in which.

DETAILED DESCRIPTION OF THE PREFERRED EMBODIMENTS

Figure 1:
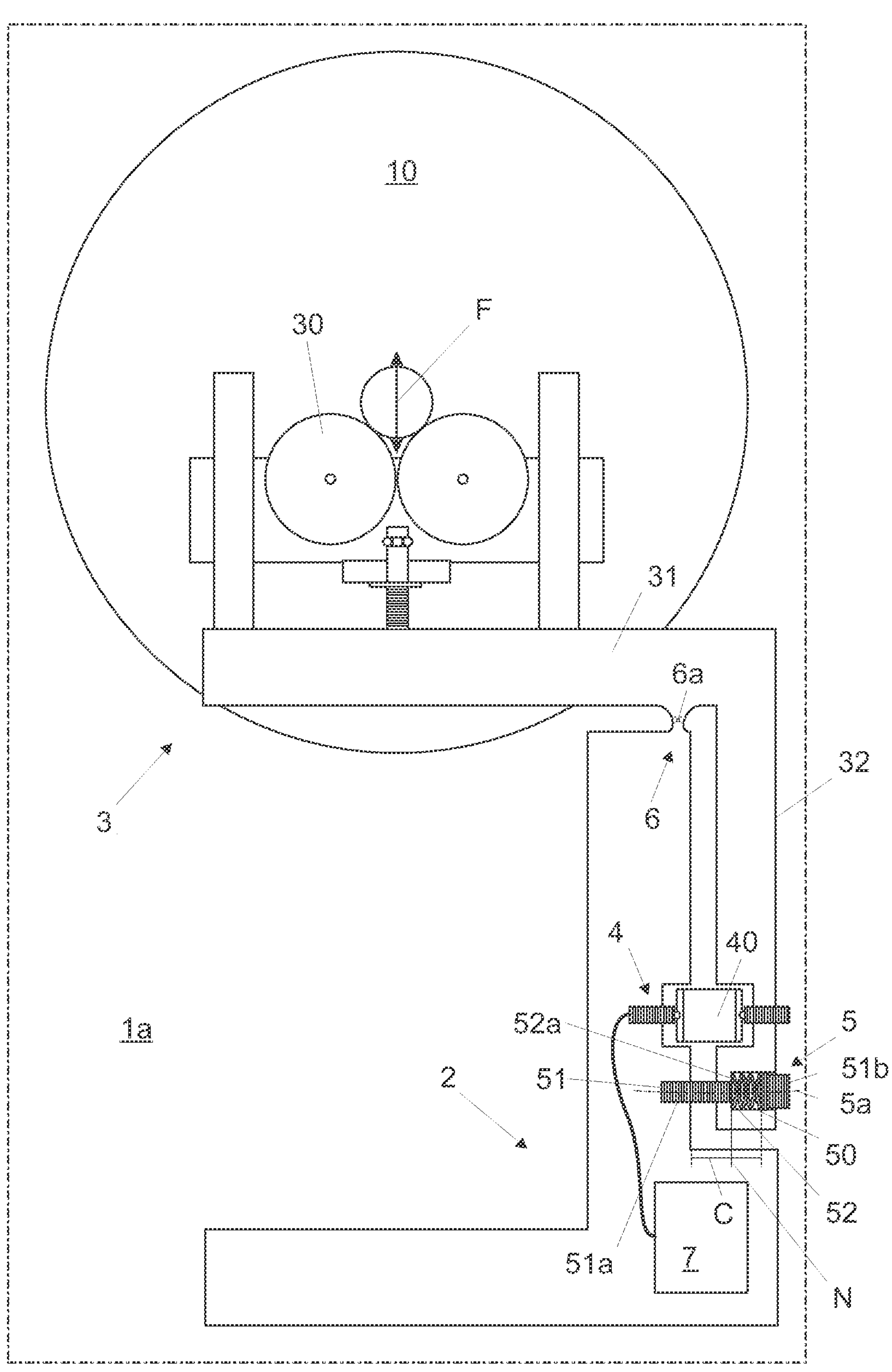
FIG. 1 illustrates a side view of a system for measuring rotational imbalances for a balancing machine of a rotating workpiece according to the invention in which first and second arms of the movable portion are mutually perpendicular.

Herein, measurements, values, geometric shapes and references (such as perpendicularity and parallelism), when associated with words such as "approximately" or other similar terms such as "nearly" or "substantially," are intended to be unless there is measurement error or inaccuracy due to production and/or manufacturing errors and, more importantly, unless there is a slight deviation from the value, measurement, shape or geometric reference with which it is associated. For example, such terms, when associated with a value, preferably indicate a deviation of no more than 10 percent of that value.

Also, when used, terms such as "first," "second," "top," "bottom," "principal," and "secondary" do not necessarily identify an order, priority of relationship, or relative position, but may simply be used to more clearly distinguish different components from one another.

Unless otherwise specified, as reflected in the following discussions, terms such as "processing," "computing," "determination," "computation," or the like are considered to refer to the action and/or processes of a computer or similar electronic computing device that manipulates and/or transforms data represented as physical, such as electronic quantities of records of a computer system and/or memories in, other data similarly represented as physical quantities within computer systems, records, or other information storage, transmission, or display devices.

Measurements and data reported in this text are, unless otherwise indicated, to be considered to have been made in ICAO International Standard Atmosphere (ISO 2533:1975).

With reference to the Figures, the system for measuring rotational imbalances for a balancing machine of a rotating workpiece balancing machine according to the invention is globally referred to as number 1.

The system 1 is preferably applicable on balancing machines, i.e., machines whose purpose is to compensate imbalances of a rotating workpiece 10. The workpiece 10 can be, for example, any rotating motor or even a simple wheel. In any case, the workpiece 10 defines its own axis of rotation around which it rotates and, therefore, it defines a rotation.

In addition, if there are imbalances in the rotation, generally due to misalignment of the center of mass with respect to the central axis of rotation, the workpiece 10 defines at least a vibration or force F.

The force F is basically determined by the imbalances of the workpiece 10 in rotation. Of course, the force F can be realized by periodic displacements along multiple directions. Preferably, however, the force F is at least definable in a plane 1*a* during rotation. The plane 1*a* is, therefore, preferably the plane perpendicular to the axis of rotation of the workpiece 10 and is the plane along which the direction of the force F of the workpiece 10 is preferably identified.

Thus, system 1 includes at least one fixed support 2.

The fixed support 2 is suitable for supporting at least the system 1. Furthermore, preferably, the fixed support 2 is also capable of indirectly supporting the workpiece 10 interacting with the system 1.

In this regard, preferably, the fixed support 2 may be a frame, for example, one that can be constrained on a floor or wall or rests stably on one of them.

Or, the fixed support 2 may be a device that can be constrained to an external structure, such as a workbench.

In this case, fixed support 2 could include a skid, such as a roller or ball bearing, capable of being operatively connected with one or more linear guides arranged on the external structure.

In particular, such a fixed support 2 can be easily translated onto the outer structure in such a way as to position it in the best possible way depending on the workpiece 10 interacting with the system 1.

The workpiece 10, in detail, is preferably capable of being fully supported to the system 1 itself. To this end, preferably, the system 1 also comprises a movable support 3.

The movable support 3 is connected to the fixed support 2. The movable support 3 is, therefore, configured to allow the housing of at least part of the workpiece 10.

By the term housing it is meant that the workpiece 10 can also simply be placed on the movable support 3.

In any case, the movable support 3 supports the workpiece 10 and the movable support 3 is, in turn, supported by the fixed support 2.

The connection between the movable support 3 and the fixed support 2 preferably is realized by at least one connector 6. The connector 6 is preferably configured to realize a labile constraint between the movable support 3 and the fixed support 2 in at least one location.

For example, connector 6 may be a hinge, suitable for realizing a fulcrum, or a lamella suitable for allowing mutual movement between supports 2, 3. Said lamella may be in one piece with supports 2 and 3 and constitute a tapering of the latter.

Preferably, the connector 6 defines a rotation axis 6*a* and allows the oscillations of the movable support 3 with respect to the fixed support 2.

The rotation axis 6*a* is substantially perpendicular to the plane 1*a*. Therefore, it is preferably parallel to the rotation axis of workpiece 10.

The movable support 3 can, therefore, micro-rotate about the rotation axis 6*a* with respect to the fixed support 2 or oscillate with respect to the same fixed support 2.

For clarity, the said rotations are not visible, but are infinitesimal perturbations or rotations that propagate through matter and are sensed by the sensors described below.

Thus, in this configuration, the movable support 3 essentially defines a lever that can rotate, at an infinitesimal level, with respect to the fixed support 2 around the rotation axis 6*a*.

Of course, connector 6 could also allow relative movements between different supports 2, 3. For example, connector 6 could also include a simple guide within which a slider constrained to movable support 3 can translate in such a way as to allow mutual translation between supports 2, 3.

In general, in any case, and with any connector 6, the movable support 3 is configured to move relative to fixed support 2 along plane 1*a*. The micro-movement or perturbation, moreover, is proportional to the force F determined by the imbalance of the workpiece 10.

Thus, in essence, the workpiece 10 resting or housed on the movable support 3 transmits force F to the movable support 3, and the latter is perturbed and/or micro-moved relative to the fixed support 2 proportionally, if not quite jointly, with the workpiece 10, in the plane 1*a*, and thus in proportion to the force F.

System 1 includes, in addition, sensing means 4.

The sensing means 4 are preferably operatively connected to the fixed support 2. They can therefore be constrained to the fixed support 2 or also constrained to the external structure as well as the fixed support 2 itself.

Preferably, the sensing means 4 are, in addition, operatively connected to the movable support 3. In particular, the sensing means 4 are capable of sensing the force F.

For this purpose, for example, the sensing means 4 may include a piezoelectric transducer 40.

The piezoelectric transducer 40 is a known element per se, in each case configured to detect an electrical signal in relation to the force/deformation to which it is subjected. Therefore, preferably, the piezoelectric transducer 40 is apt to be placed in contact with the movable substrate 3 such that the latter, when moved, deforms the piezoelectric transducer 40 in proportion to the force F.

In detail, the piezoelectric transducer 40 is disposed between the supports 2, 3.

Therefore, it can form a rigid connection between supports 2, 3.

Advantageously, system 1 also comprises blocking means 5.

The blocking means 5 are configured to be constrained in a compliant way the movable support 3 and the fixed support 2. Specifically, the blocking means 5 are configured to constrain the supports 2, 3 in such a way as micro-movement or transmission of relative perturbations between movable support 3 and fixed support 2 is allowed exclusively along a predetermined trajectory 5*a*.

The predetermined trajectory 5*a* preferably lies on the plane 1*a*. Thus, the blocking means 5 basically controls at least in part the relative movement between supports 2, 3.

Advantageously, the blocking means 5 also include opposition means 50.

The opposition means 50 are used to give a preload to the transducer. Preload preferably generates a moment, relative to the connector 6 opposite to that generated by the workpiece 10 when placed on the movable support 3. The moment generated by the preload is, preferably, about two orders of magnitude higher, more precisely that on average it is in the order 50-100 times than the moment generated by the workpiece 10 when placed on the supports.

As mentioned above, preferably, supports 2, 3 are reciprocally connected via connector 6. The latter is preferably spaced from the blocking means 5. Therefore, considering that preferably the movable support 3 can make infinitesimal oscillations or perturbations around the rotation axis 6*a* proportional to the force F the predetermined trajectory 5*a* is preferably substantially straight.

From a structural point of view, in detail, the blocking means 5 comprise at least one screw 51.

The screw 51 develops substantially along the predetermined trajectory 5*a*. Thus, screw 51 is integral to the fixed support 2. In even more detail, the screw 51 comprises a stem 51*a* and a head 51*b*.

The stem 51*a* is preferably constrained to the fixed support 2. The head 51*b* is a portion of the screw 51 having a larger diameter than the stem 51*a* and arranged at the end of the stem 51*a* opposite the fixed support 2.

The blocking means 5, in addition, comprises a guide 52.

In detail, the guide 52 is defined on the movable support 3. In addition, the guide 52 houses the head 51*b* and defines a bottom 52*a*. The bottom 52*a* is substantially perforated and threaded in order to be suitable for the stem 51*a* and not the head 52*b* to pass through.

In each case, advantageously, opposition means 50 are arranged between head 51*b* and bottom 52*a*.

In particular, the opposition means 50 are of an elastic type and more preferably comprise a linear spring developed substantially along the predetermined trajectory 5*a*, or around the screw 51.

Figure 2:
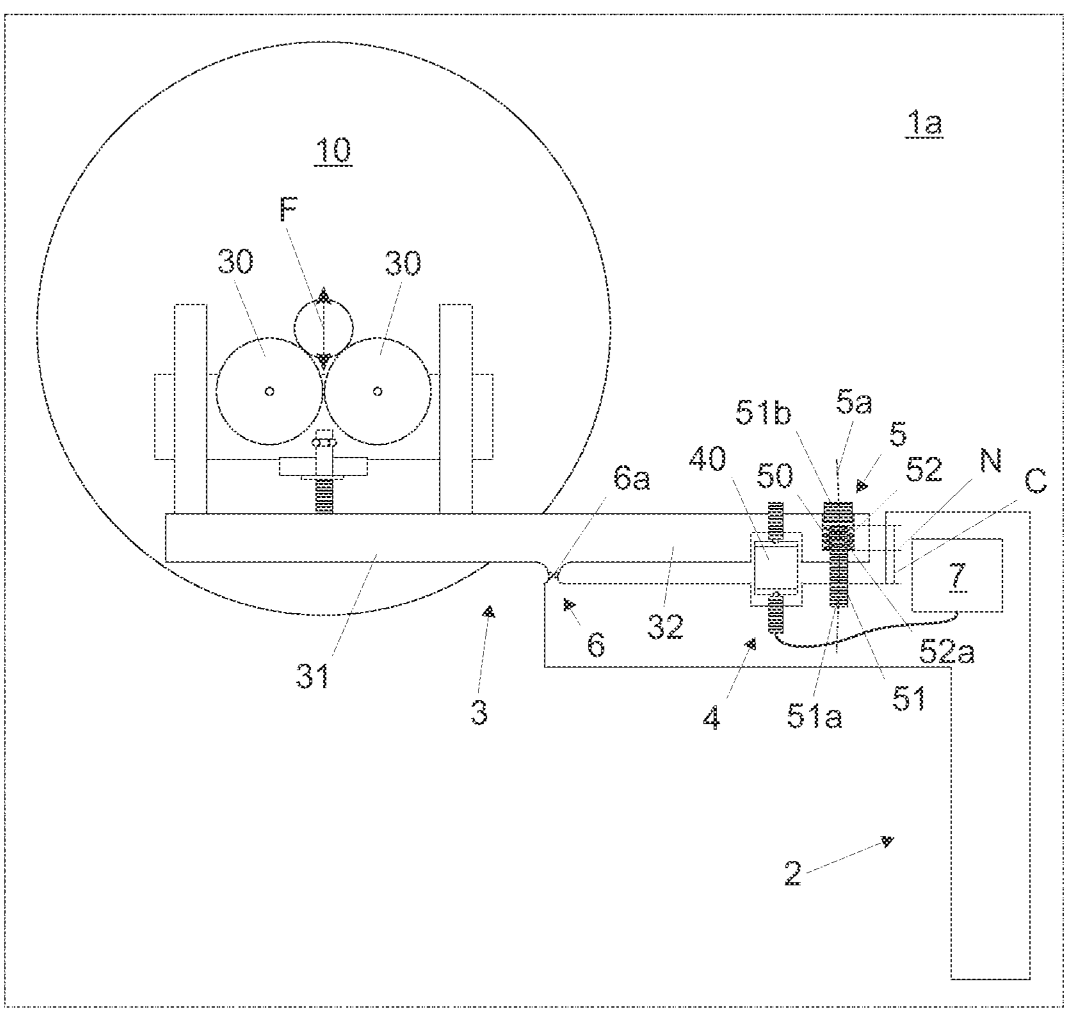
FIG. 2 illustrates a side view of a system for measuring rotational imbalances for a balancing machine of a rotating workpiece according to the invention in which first and second arms of the movable portion are mutually aligned.

In the preferred forms of implementation, shown in FIGS. 1-2, movable support 3 can define particular configurations.

In particular, movable support 3 defines a first-degree lever having its fulcrum at connector 6.

Therefore, preferably, the movable support 3 includes a first arm 31 and a second arm 32. The first arm 31 and the second arm 32 are separated by the connector 6.

In addition, the first arm 31 is constrained to the fixed support 2 by means of the blocking means 5 at its own end opposite the connector 6.

The second arm 32, on the other hand, is the portion of the movable support 3 suitable for supporting the workpiece 10.

In this regard, the movable support 3 may comprise a plurality of rollers 30.

The rollers 30 preferably define their own rotation axes parallel to the rotation axis 6*a*.

In addition, the rollers 30 may be, for example, two in number and are preferably suitable for accommodating part of the workpiece 10. If the workpiece 10 has a shaft, the rollers 30 may be suitable for allow the shaft to rest on its side surface.

More specifically still, the rollers 30 are preferably arranged in correspondence with an end of the first arm 31 opposite the connector 6.

The arms 31, 32 are, in addition, mutually aligned, as in the form of realization of FIG. 2, or they may be perpendicular to each other, as shown in FIG. 1.

In the forms of realization just described, preferably, the sensing means 4 are arranged between the connector 6 and the blocking means 5. Thus, the sensing means 4 define, as mentioned above, a rigid connection between the movable support 3 and the fixed support 2.

In conclusion, system 1 may include control means 7.

If present, the control means 7 may essentially include an electronic processor capable of receiving electrical type signals, processing them and possibly comparing them with other data.

The control means 7 may, therefore, include a database, a management system, and other hardware or software elements capable of enabling the management and control of certain parts of system 1.

The control means 7, in fact, are preferably operatively connected to at least sensing means 4. In addition, the control means 7 are at least configured to record the forces F detected by the sensing means 4.

The operation of the system 1 for measuring rotational imbalances for a balancing machine of a rotating workpiece previously described in structural terms is as follows.

Basically, once a workpiece 10 is laid on the rollers 30 and once it is placed in rotation, the intensity of the forces F can be detected by the sensing means 4.

The weight difference that may characterize workpieces 10 resting on the movable support 3 does not afflict system 1 with any particular problems that may impact accuracy since the movements or forces of the movable support 3 due to weight are fully compensated for by the blocking means 5, which are, moreover, facilitated by the fact that the sensing means 4 themselves define a rigid constraint between fixed support 2 and movable support 3.

Therefore, the rotary imbalance measuring system 1 for balancing machine of a rotating workpiece according to the invention achieves important advantages.

In fact, the system 1 for measuring rotational imbalances for a balancing machine of a rotating workpiece makes it possible to effectively detect forces on rotating devices of any weight and size within the maximum capacity of the system.

In addition, system 1 for measuring rotational imbalances for a balancing machine of a rotating workpiece defines a simple and economical structure in the face of high efficiency.

Specifically, in fact, the system 1 for measuring rotational imbalances for a balancing machine of a rotating workpiece enables accurate measurements in a universal way, without having to change its behavior or structural configuration.

The invention is susceptible to variations within the scope of the inventive concept defined by the claims. Within this scope all details are substitutable by equivalent elements and the materials, shapes and sizes can be any.

The invention claimed is:

1. A system for measuring rotational imbalances for a balancing machine of a rotating workpiece, said workpiece defining a rotation and a force determined by imbalances in at least one plane during said rotation, said system comprising:

a fixed support;

a movable support connected to said fixed support; the movable support being configured to allow housing at least part of said workpiece and configured to allow micro-movements relative to said fixed support along said plane proportional to said force, a sensor operatively connected to said fixed support and said movable support and configured sense said force; and a blocking system being configured to constrain said movable support and said fixed support to allow said relative micro-movement between said movable support and said fixed support exclusively along a predetermined trajectory lying on said plane, the blocking system including an opposing system generating a moment opposite to the moment generated by said workpiece when positioned on said movable support, the blocking system comprising at least one screw developed along said predetermined trajectory, integral with said fixed support, the at least one screw comprising a stem attached to said fixed support, and a head, and a guide defined on said movable support, the guide housing said head and defining a perforated bottom configured to allow passage of said stem along said predetermined trajectory and to obstruct movement of said head beyond said perforated bottom, the opposition system being disposed between said head and said perforated bottom.

2. The system according to claim 1, wherein said supports are reciprocally connected via a connector spaced from said blocking system and defining a rotation axis perpendicular to said plane around which said movable support microrotates with respect to said fixed support.

3. The system according to claim 1, wherein said sensor is disposed between said connector and said blocking system and rigidly connects said movable support and said fixed support.

4. The system according to claim 2, wherein said movable support defines a lever of first degree having a fulcrum at said connector and including a first arm and a second arm separated by said connector, said first arm being constrained to said fixed support by said blocking system at an end opposite said connector.

5. The system according to claim 4, wherein said arms are mutually aligned or are perpendicular to each other.

6. The system according to claim 1, wherein said sensor comprises at least one piezoelectric transducer disposed between said supports.

7. The system according to claim 1, wherein said opposition system is an elastic comprising a linear spring developing along said predetermined trajectory.

8. The system according to claim 1, wherein said movable support comprises a plurality of rollers disposed in correspondence with an end of said first arm opposite to said connector and configured to allow a shaft of said workpiece to rest on its lateral surface.

9. The system according to claim 1, further comprising a controller operatively connected at least to said sensor and configured to record said vibration.

* * * * *